United States Patent [19]

Kuo

[11] Patent Number: 5,328,182
[45] Date of Patent: Jul. 12, 1994

[54] TROLLEY CLIMBABLE ON STAIRCASE

[76] Inventor: Ya-Hua Kuo, P.O. Box 55-1670, Taipei, Taiwan

[21] Appl. No.: 89,589

[22] Filed: Jul. 12, 1993

[51] Int. Cl.$^5$ .............................................. B62B 5/02
[52] U.S. Cl. .................................. 280/5.32; 280/641; 280/643; 280/47.21
[58] Field of Search .................... 280/5.2, 5.24, 5.28, 280/5.32, 5.22, 5.26, 5.3, 43.15, 43.16, 47.12, 47.21, 47.34, DIG. 3, DIG. 4, 641, 642, 643, 644

[56] References Cited

U.S. PATENT DOCUMENTS

| | | | |
|---|---|---|---|
| 2,243,915 | 6/1941 | Mueller | 280/5.32 |
| 2,397,317 | 3/1946 | Hulburt et al. | 280/641 |
| 2,632,653 | 3/1953 | Rollie et al. | 280/641 |
| 2,670,216 | 2/1954 | Leonard | 280/643 |
| 2,710,106 | 6/1955 | Hanson | 280/47.21 |
| 3,074,734 | 1/1963 | Munson | 280/641 |
| 4,722,538 | 2/1988 | Freyman | 280/5.32 |
| 5,090,724 | 2/1992 | Fiore | 280/643 |

*Primary Examiner*—Margaret A. Focarino
*Assistant Examiner*—Anne Marie Boehler

[57] ABSTRACT

A trolley includes a basket having a rear portion of the basket secured to a rear frame having a pair of rear wheels rotatably mounted on a lower portion of the rear frame, and a handle pivotally secured to the rear frame having a pair of front wheels rotatably mounted on a lower portion of the handle having a bottom supporting rod transversely formed on a lower portion of the handle for normally supporting a bottom portion of the basket for loading materials in the basket, the handle being pivoted about the rear frame to retract the front wheels rearwardly to approximate the rear wheels for inclining the basket rearwardly for moving a gravity center of the basket towards a position between the front wheels as rearwardly retracted and the rear wheels, suitable for a safer climbing or descending on a staircase.

1 Claim, 5 Drawing Sheets

TROLLEY CLIMBABLE ON STAIRCASE

BACKGROUND OF THE INVENTION

A conventional shopping trolley as shown in FIGS. 5, 6 may be used to load foods, vegetables, and other daily commodities when buying somethings from a supermarket or shopping center, having a pair of rear wheels 3 and a pair of front wheels 5 rotatably mounted to a basket 1 and a handle 4 pivotally secured to the upper bars of the basket 1 by pivots 40. When using such a conventional trolley for climbing a staircase S as shown in FIG. 6, the front wheels 5 is separated from the rear wheels 3, unstably rested on the staircase S and the gravity center W when loaded by heavy materials in the basket 1 will be moved outwardly, possibly causing an outwardly deviating gravity center W of the trolley and possibly causing a rearwardly collapse of the trolley carrying person, especially dangerous for a weak old woman, when climbing a staircase.

Even though the basket 1 may be folded as shown in dotted line of FIG. 6 to move the gravity center rearwardly, the materials such as foods stored in the basket 1 may however be compressed, squeezed, or even damaged or broken.

It is therefore expected to disclose a safer trolley climbable on a staircase.

SUMMARY OF THE INVENTION

The object of the present invention is to provide a trolley including a basket having a rear portion of the basket secured to a rear frame having a pair of rear wheels rotatably mounted on a lower portion of the rear frame, and a handle pivotally secured to the rear frame having a pair of front wheels rotatably mounted on a lower portion of the handle having a bottom supporting rod transversely formed on a lower portion of the handle for normally supporting a bottom portion of the basket for loading materials in the basket, the handle being pivoted about the rear frame to retract the front wheels rearwardly to approximate the rear wheels for inclining the basket rearwardly for moving a gravity center of the basket towards a position between the front wheels as rearwardly retracted and the rear wheels, suitable for a safer climbing or descending on a staircase.

DETAILED DESCRIPTION

Figure 1:
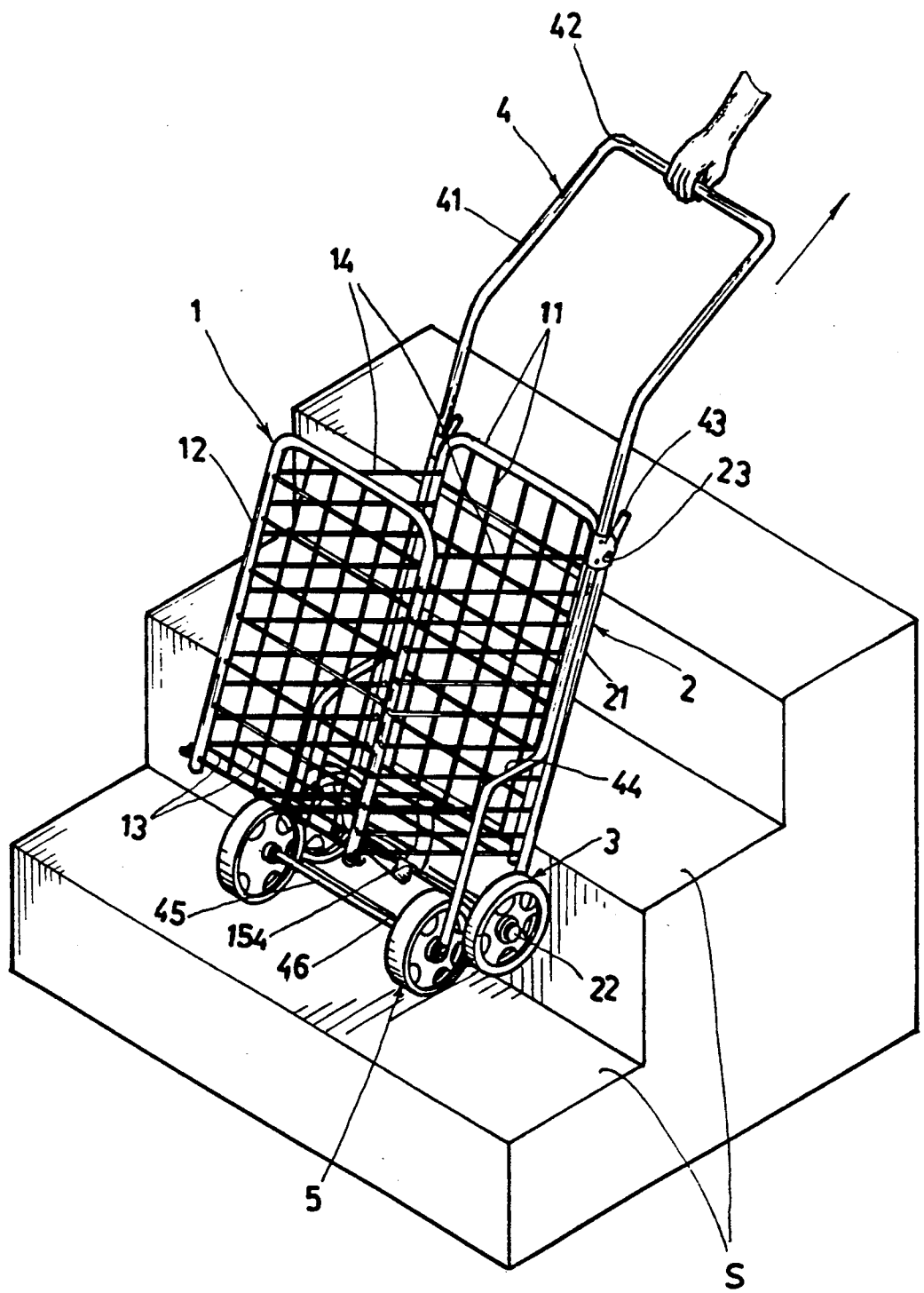
FIG. 1 is a perspective view of the present invention when climbing on a staircase.
Figure 2:
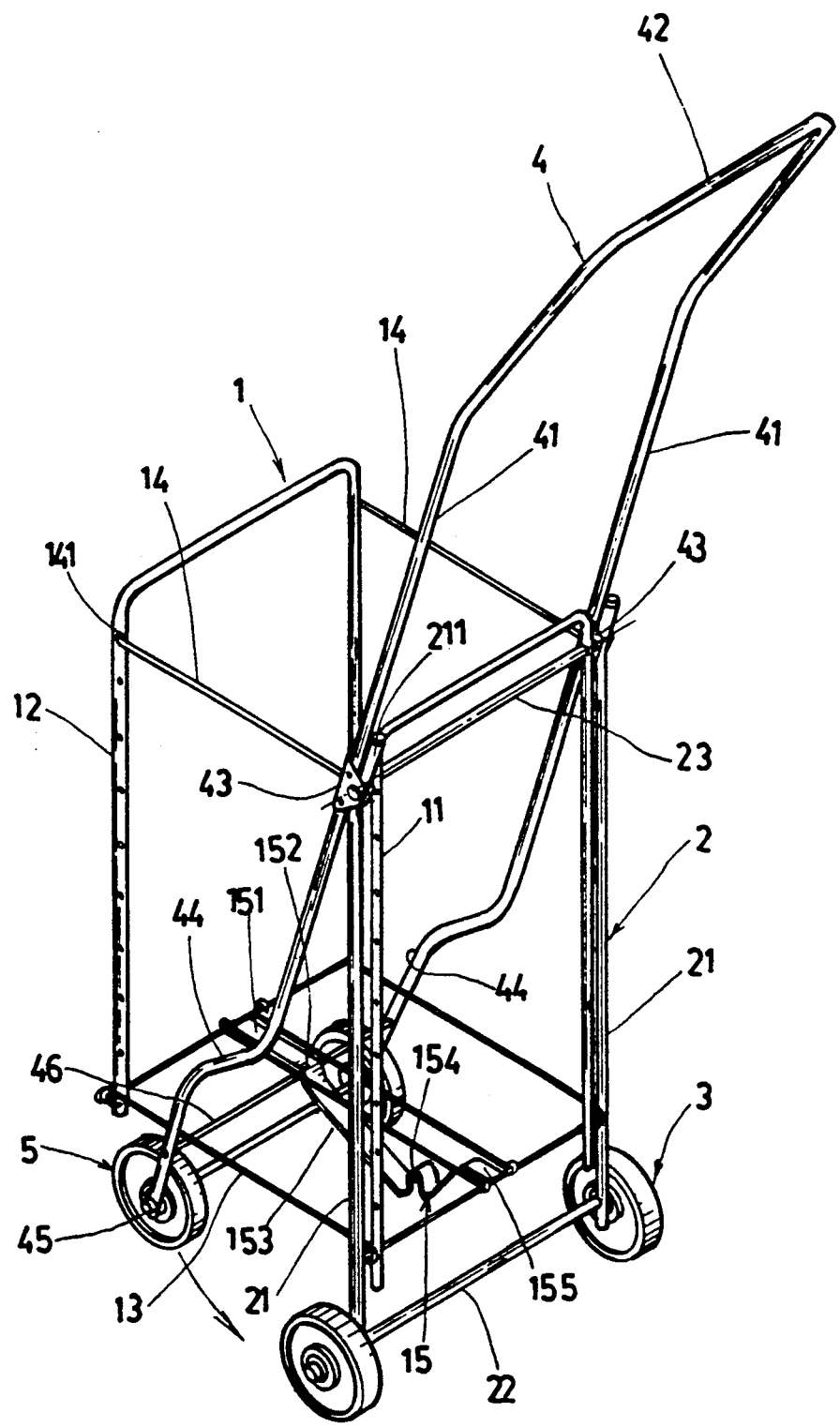
FIG. 2 is an illustration showing a skeleton of the present invention.

As shown in FIGS. 1-4, the present invention comprises: a basket 1, a rear frame 2, a pair of rear wheels 3, a pair of front wheels 5, and a handle means 4. Some modifications can still be made in accordance with the present invention. For instance, the basket 1 and the rear frame 2 may be modified to be an unique basket structure. The modifications are not limited in this invention.

The basket 1 generally parallelepiped shaped includes: a rear grating 11 secured to a pair of side bars 21 of the rear frame 2, a front grating 12, a bottom grating 13, and a pair of side gratings 14 each side grating 14 pivotally secured between the front grating 12 and the rear grating 11 such as by inwardly bending a rod end disposed on each end portion of each rod forming the side grating 14 to be pivotally mounted in a side bar or rod of either the front grating 12 or the rear grating 11 so that the front grating 12 may be foldable towards the rear grating 11, the bottom grating 13 being also foldable between the front grating 12 and the rear grating 11, and a guiding plate 15 formed under and secured to the bottom grating 13 for inclinedly guiding a bottom supporting rod 46 of the handle means 4 when pivotally folding or unfolding the handle means 4 on the rear frame 2.

Figure 3:
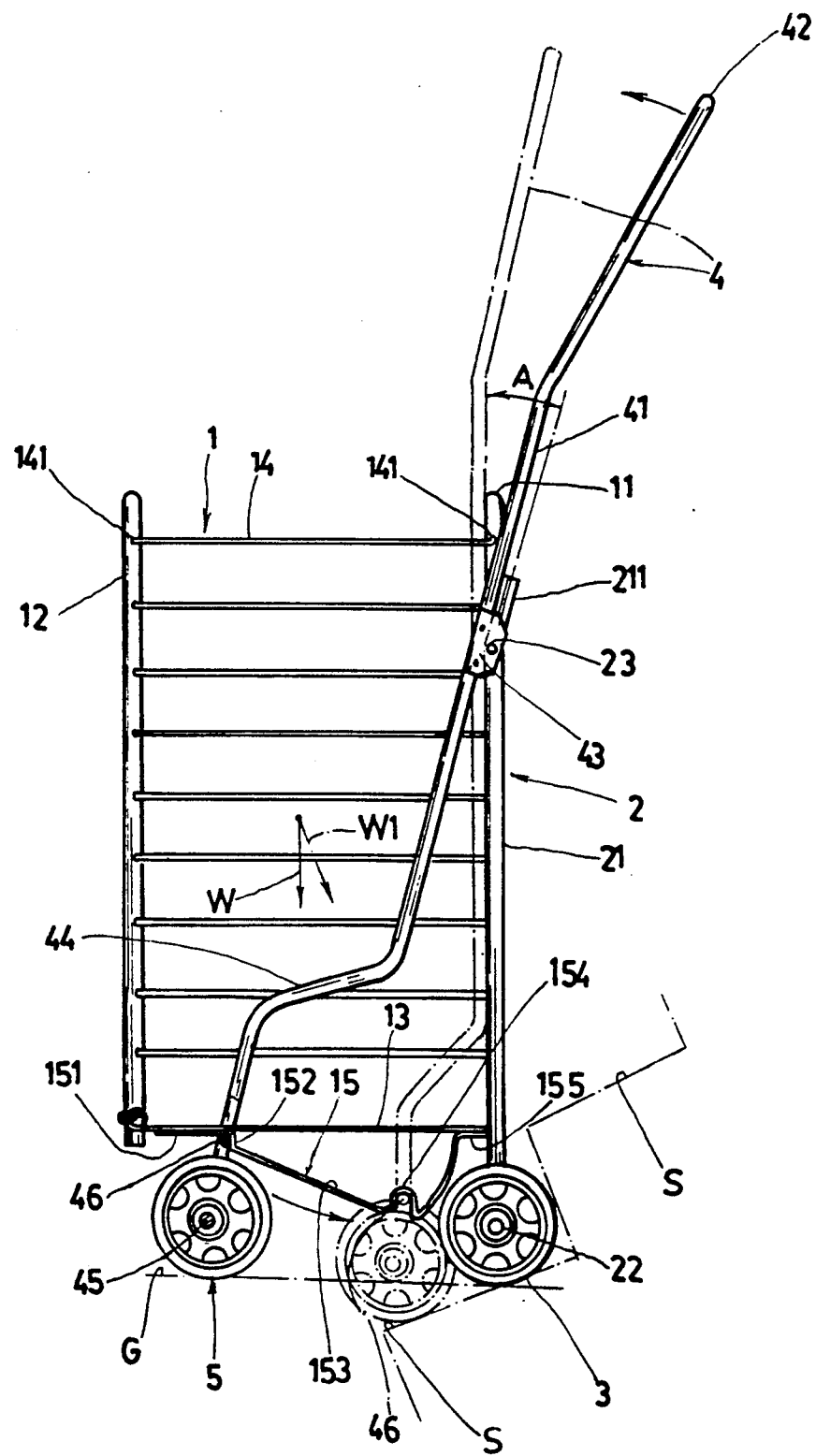
FIG. 3 is a side-view illustration of the present invention.

The rear frame 2 secured with the basket 1 includes a rear axle 22 transversely secured on a lower portion of the rear frame 2 passing through the two side bars 21 for rotatably mounting the pair of rear wheels 3 on the rear axle 22. Each side bar 21 has an upper inclined portion 211 formed on an upper portion of the side bar 21 for resting the handle means 4 when folding the handle means 4 towards the rear frame 2 as shown in FIG. 3. A pivot rod 23 is transversely formed on an upper portion of the rear frame 2 for pivotally connecting the handle means 4 by means of a fulcrum lug 43 secured with the handle means 4.

The handle means 4 includes: two straight bar portions 41 parallelly disposed on two opposite sides of the basket 1 having a U-shaped handle 42 formed on an upper portion of each straight bar portion 41 for connecting the two straight bar portions 41 for pushing or pulling the trolley of this invention, each straight bar portion 41 having a fulcrum lug 43 secured thereon for pivotally securing the straight bar portion 41 to an upper portion of each side bar 21 of the rear frame 2, a front axle 45 transversely secured on a lowermost portion of the handle means 4 for rotatably mounting a pair of front wheels 5 on the front axle 45, and a bottom supporting rod 46 transversely formed on a lower portion of the handle means 4 above the front axle 45 for slidably engaging a guiding plate 15 formed on a bottom portion of the bottom grating 13 of the basket 1.

Each straight bar portion 41 of the handle means 4 may be bent frontwardly to form a deflecting portion 44 for connecting the front axle 45 for rotatably mounting the front wheels 5 thereon.

Figure 4:
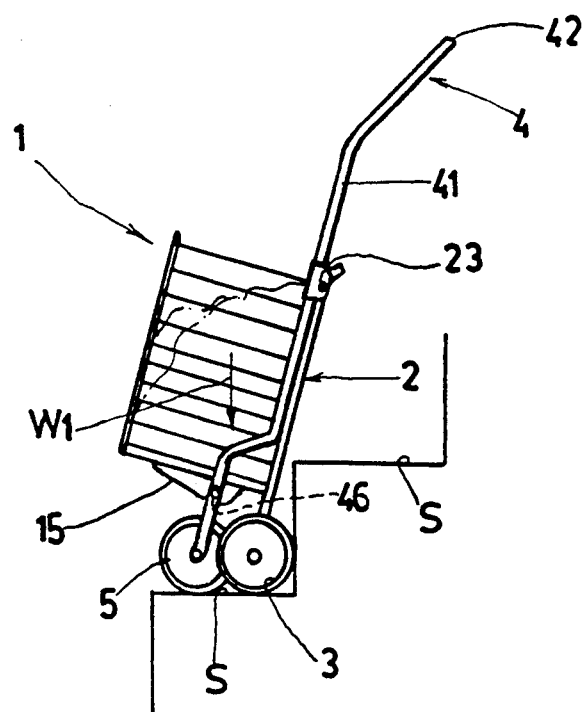
FIG. 4 is an illustration showing a safe stable climbing of the present invention on a staircase.
Figure 5:
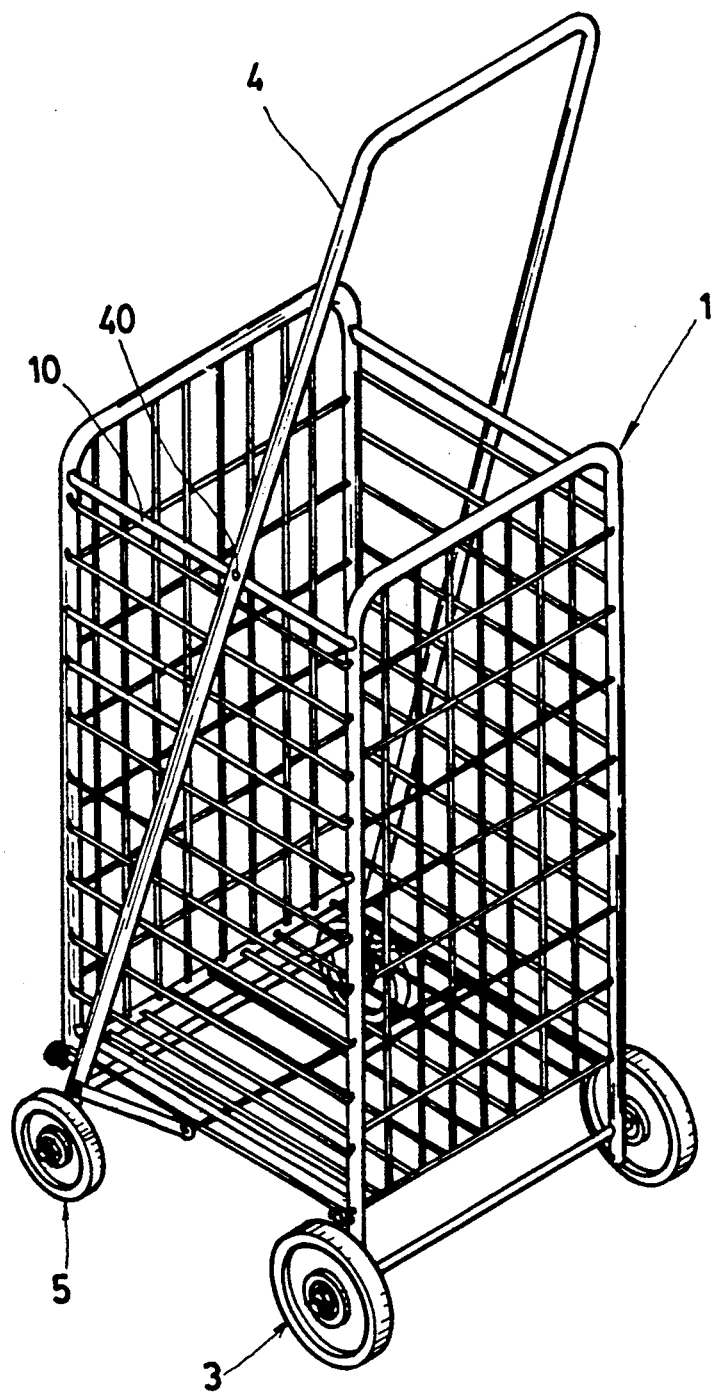
FIG. 5 shows a conventional trolley.

The guiding plate 15 secured on a bottom portion of the bottom grating 13 of the basket 1 includes a front plate portion 151 secured to a front portion of the bottom grating 13 of the basket 1, a front groove 152 recessed in between the front plate portion 151 and a sloping portion 153 with the sloping portion 153 inclined rearwardly downwardly from the front plate portion 151 towards the rear wheels 3, a lowest groove 154 recessed in a lowermost portion of the sloping portion 153 of the guiding plate 15 adjacent to the rear wheels 3 (especially as shown in FIG. 3), and a rear plate portion 155 secured to a rear portion of the bottom grating 13 of the basket 1. The bottom supporting rod 46 of the handle means 4 is slidably engageable with the slopping portion 153 of the guiding plate 15 of the basket 1 to be normally engaged with the front groove 152 for normally supporting the basket 1 when the handle means 4 is unfolded to extend the front wheels 5 frontwardly for a normally loading and carrying purpose of the basket i normally running on a ground surface G while the gravity center line W is perpendicular to the bottom grating 13 of the basket 1 as shown in FIG. 3 (full line); and operatively engageable with the lowest groove 154 of the guiding plate 15 when rearwardly moved towards the rear wheels 3 by biasing the handle means 4 about the pivot rod 23 as shown in dotted line of FIG. 3 to approximate the two straight bar portions 41 of the handle means 4 to the two side bars 21 of the rear frame to rearwardly move the gravity center towards the rear wheels 3 closer to a person carrying the trolley of this invention by projecting the gravity center line W1 to intersect the bottom grating 13 of the basket 1 to form an acute angle with the rear frame 2 as shown in FIG. 4, thereby enhancing a stable gravity of the basket 1 when carried with the heavy materials in the basket 1 towards the person who carrys the trolley for a safer and stabler climbing operation of the trolley on the staircase S as shown in FIG. 4.

The handle means 4 may then be biased to move the front wheels 5 frontwardly to recover the normal loading condition as shown in full line of FIG. 3 when normally running on a flat ground surface G.

Figure 6:
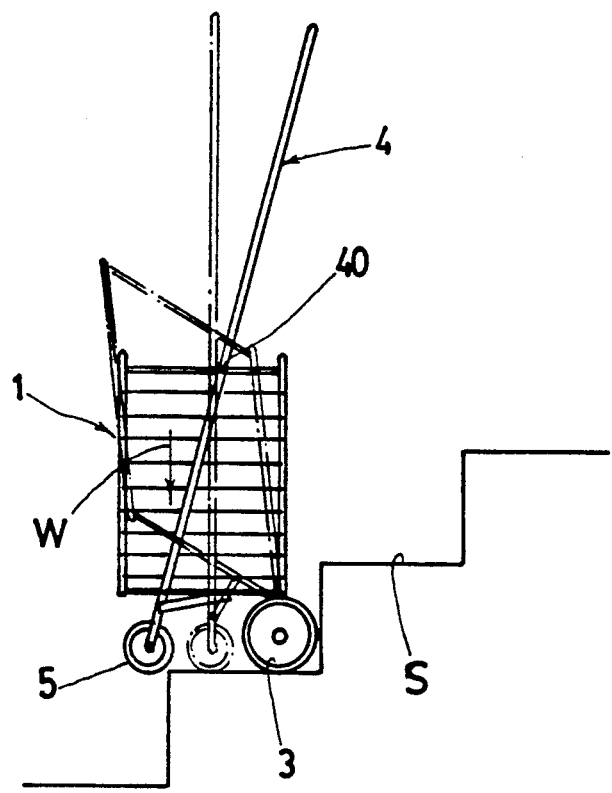
FIG. 6 shows the conventional trolley climbing on a staircase.

The present invention is superior to the conventional trolley as shown in FIG. 6 since this invention may retract the front wheels 5 towards the rear wheels 3 by engaging the supporting rod 46 of the handle means 4 with the lowest groove 154 of the guiding plate 15 of the basket 1 to move the gravity center line W1 to be near a person who carries the trolley to increase the stability of the trolley when loaded with materials inside the basket 1 to easily climb the trolley on a staircase S and for safely carrying the trolley to prevent collapse of the trolley carrier in climbing or descending on a staircase.

The basket 1 can be made as foldable by folding the front grating 12, the side gratings 14, and the bottom grating 13 towards the rear grating 11 by any conventional folding mechanism, which is not limited and claimed in this invention.

The present invention may be modified without departing from the spirit and claim of this invention.

The basket 1 of this invention may be further mounted with a shallow pan or disk for collecting any water drops drained from the storing materials in the basket 1 to prevent a wetting contamination on a ground floor when running the trolley thereon.

I claim:
1. A trolley comprising:
a basket generally parallelpiped shaped and comprised of a rear grating secured to a rear frame, a front grating, a bottom grating and two side gratings, having a pair of rear wheels rotatably mounted on a lower portion of the rear frame and having a guiding plate secured on the bottom grating and generally sloping rearwardly downwardly recessed with a lowest groove in the guiding plate; and a handle means pivotally secured to the rear frame having a pair of front wheels rotatably mounted on a lowermost portion of the handle means, and having a bottom supporting rod formed on a lower portion said handle means and operatively biased to retract the front wheels rearwardly towards the rear wheels to engage the lowest groove in said guiding plate for moving a gravity center of the basket rearwardly to approximate a person carrying the trolley adapted for safely climbing a staircase; said rear frame secured with the basket including a rear axle transversely secured on a lower portion of the rear frame passing through two side bars of the rear frame for rotatably mounting the pair of rear wheels on the rear axle, each said side bar having an upper inclined portion formed on an upper portion of each said side bar for resting the handle means when folding the handle means towards the rear frame, having a pivot rod transversely formed on an upper portion of the rear frame for pivotally connecting the handle means by means of a fulcrum lug secured with the handle means;

said handle means including: two straight bar portions parallelly disposed on two opposite sides of the basket having a U-shaped handle formed on an upper portion of each straight bar portion for connecting the two straight bar portions for pushing or pulling the trolley, each said straight bar portion having said fulcrum lug secured thereon for pivotally securing the straight bar portion to an upper portion of each said side bar of the rear frame, a front axle transversely secured on a lowermost portion of the handle means for rotatably mounting said pair of front wheels on the front axle, and the bottom supporting rod transversely formed on a lower portion of the handle means above the front axle for slidably engaging the guiding plate formed on a bottom portion of the bottom grating of the basket; and said guiding plate including a front plate portion secured to a front portion of the bottom grating of the basket, a front groove recessed in between the front plate portion and a sloping portion with the sloping portion inclined rearwardly downwardly from the front plate portion towards said pair of rear wheels mounted on said rear frame, said lowest groove recessed in said lowermost portion of the sloping portion of the guiding plate adjacent to the rear wheels, and a rear plate portion secured to a rear portion of the bottom grating of the basket.

* * * * *